United States Patent [19]

Kunkel et al.

[11] Patent Number: 4,966,572
[45] Date of Patent: Oct. 30, 1990

[54] DRIVE AND BEARING FOR WATER PUMP

[75] Inventors: Heinrich Kunkel; Armin Olschewski, both of Schweinfurt, Fed. Rep. of Germany

[73] Assignee: SKF GmbH, Schweinfurt, Fed. Rep. of Germany

[21] Appl. No.: 385,716

[22] Filed: Jul. 27, 1989

[30] Foreign Application Priority Data

Jul. 28, 1988 [DE] Fed. Rep. of Germany ....... 3825633

[51] Int. Cl.⁵ .............................................. F16H 55/36
[52] U.S. Cl. ..................................................... 474/199
[58] Field of Search ................ 474/198, 199, 166, 167

[56] References Cited

U.S. PATENT DOCUMENTS

| 4,474,562 | 10/1984 | Heurich ........................... 474/199 X |
| 4,516,962 | 5/1985 | Brandenstein et al. ......... 474/199 X |
| 4,610,645 | 9/1986 | Donn et al. ...................... 474/199 X |

FOREIGN PATENT DOCUMENTS 0173972 1/1961 Sweden ................................ 474/199

Primary Examiner—Thuy M. Bui
Attorney, Agent, or Firm—Eugene E. Renz, Jr.

[57] ABSTRACT

A water pump having a water pump housing, a housing flange mounted on the water pump housing, and a pump rotor rotatably journaled in the housing. A hollow stud projects axially outwardly from the flange; a drive and bearing assembly for supporting the pump rotor comprising a roller bearing supported on the outer peripheral surface of the hollow stud, and a pulley rotatably supported by the roller bearing on the hollow stud of the housing flange. A shaft supports the pump rotor and passes through the hollow stud. A coupling element connects the pulley to the shaft in a torsion-proof manner and simultaneously centers the shaft whereby the roller bearing is tightened to eliminate axial play.

14 Claims, 3 Drawing Sheets

DRIVE AND BEARING FOR WATER PUMP

FIELD OF THE INVENTION

The present invention relates to improvements to the drive and a bearing for a water pump assembly.

BACKGROUND OF THE INVENTION

Drive and bearing assemblies for water pumps are not new per se. Typically, these assemblies comprise a housing having a housing flange with an axially outwardly projecting hollow stud to support a roller bearing. The assembly further includes a shaft carrying the pump rotor and pulley that sits on the roller bearing. In accordance with a known prior design shown in West German Registered Design No. 73-39,167, the shaft and the pulley constitute a single part as illustrated in FIG. 2 of this design.

In the design described above, the bearing comprises a single roller bearing having a set of rollers and a set of balls. This bearing centers the pulley and by means of a coupling element centers the shaft which carries the pump rotor without the need for a second bearing. However, since this bearing is not tightened axially, the pulley is not guided with precision in the axial direction and thus the shaft also lacks axial guidance. This results in increased noise levels. Furthermore by reason of imprecise axial guidance, there is a danger that the belt running on the pulley, particularly a flat belt will wobble and flutter and additionally the slip ring seal normally used tends to wear rapidly.

SUMMARY OF THE INVENTION

With the foregoing in mind, it is the object of the present invention to provide a new and improveed drive mechanism and bearing of the general type described above wherein the roller bearing is precisely guided in the radial and particularly in the axial direction and in the overall assembly operates with reduced vibration levels thereby extending the life of the bearings considerably.

To this end in accordance with the present invention the roller bearing is secured or fastened in a way to eliminate axial play. This can be done by a installing an axially tightened bearing in the assembly at the factory or in accordance with a feature of the present invention by providing means for eliminating the axial play of the roller bearing. The means for eliminating play, in accordance with the present invention, can consist of a spring element mounted between the shaft and the roller bearing which acts in an axial direction. This arrangement can be implemented in several different ways. For example, the coupling element can be mounted in a torsion-proof manner allowing freedom of axial displacement on the shaft and the spring element can be located between the shaft and the coupling element. In an arrangement of this type, it is advisable to provide a spring acting in the axial direction between a contact surface on the shaft and the coupling element. Another alternative is to connect the coupling element in a torsion-proof manner but without freedom of axial displacement relative to the shaft and to locate the spring element between the shaft and the housing flange. In this instance, a spring acting in the axial direction is provided between a contact surface on the shaft and the housing flange. It is noted that it is advisable for the rear surface of the pump rotor to serve as the contact surface for the spring. In accordance with another feature of the present, invention it is possible to recess a thrust washer or the like made of friction reducing material into the rear surface of the pump rotor and thereby reduce wear.

When a slip ring seal equipped with an axial adjusting spring is used, the adjusting spring of the slip ring seal can be used simultaneously to eliminate the axial play of the roller bearing. To achieve optimum result, the spring should be of a design so that it tightens the roller bearing to the extent required. To maintain the surface pressure on the seal within certain prescribed limits, the contact surface should be dimensioned appropriately.

In accordance with another feature of the present invention, the coupling element may be designed as a spring element acting in the axial direction connected in a torsion-proof manner without freedom of axial displacement to the shaft and to the pulley.

In accordance with still other features of the present invention, the pulley and the coupling element can be made as a single part and in this instance, this pulley and the coupling element are made in the form of a cup having an axially and inwardly directed essentially ring shaped projection in the center of the base of the cup which is fitted into the end of the shaft. To insure transmission of torque in accordance with another feature of the invention, the end of the shaft is designed of a polygonal cross section and a hole in the projection is provided with a correspondingly complementary polygonal shape.

BRIEF DESCRIPTION OF THE DRAWINGS

These and other objects of the present invention and the various features and details of the operation and construction thereof are hereinafter more fully set forth with reference to the accompanying drawings, wherein.

DETAILED DESCRIPTION OF THE PREFERRED EMBODIMENT

Figure 1:
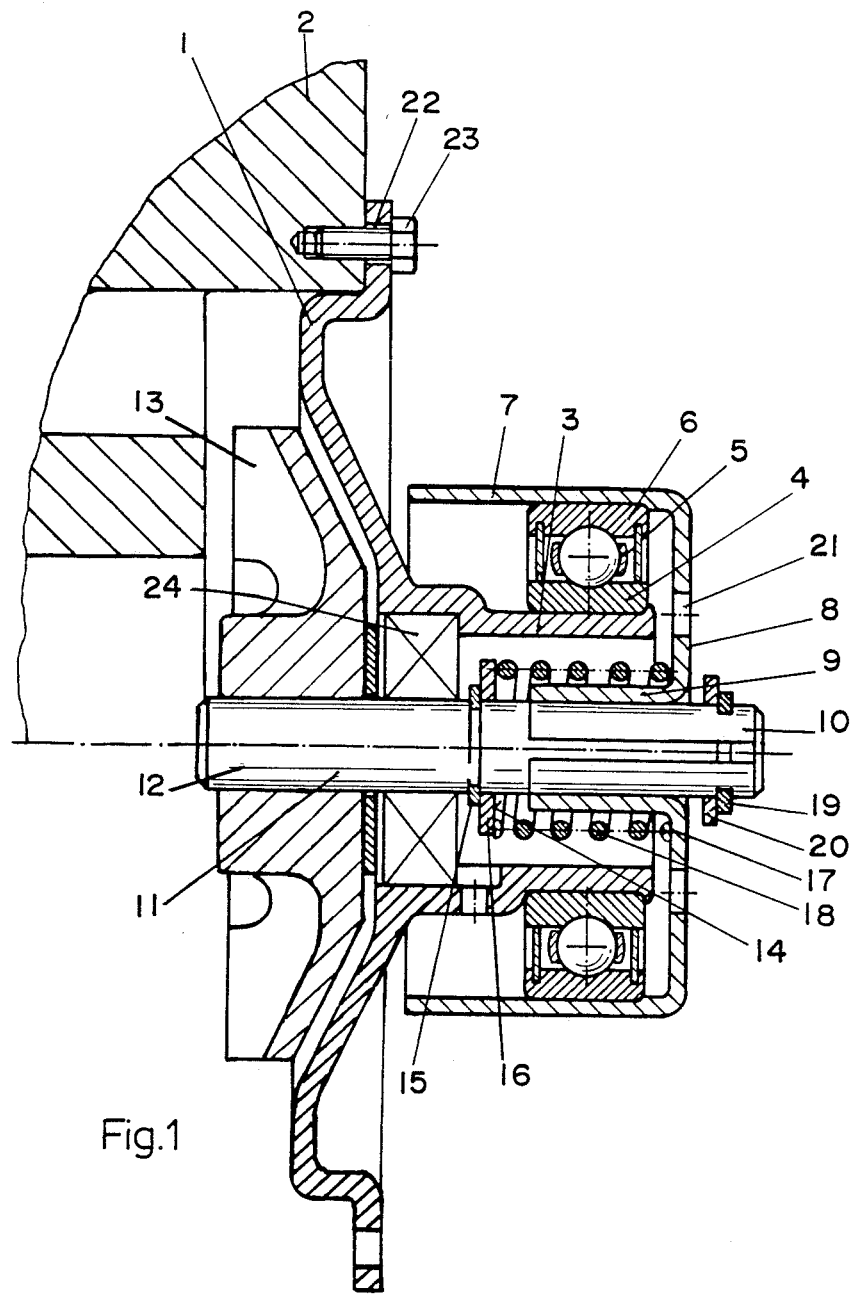
FIG. 1 is a transverse sectional view through principal embodiment of the present invention wherein the coupling element is free to move axially on the shaft and the spring element is located between the shaft and the coupling element.

Referring now to the drawings and particularly to FIG. 1, thereof, there is illustrated a fragmentary transverse sectional view of a portion of a water pump assembly including a housing flange (1) mounted on the water pump housing [2]. A shaft (11) which mounts a pump rotor (13) is rotatably journaled in the pump housing flange (1) by means including a bearing (5) mounted on the axially outwardly projectioning hollowed stud portion (3) of the housing flange (1). The outer ring (6) of the roller bearing (5) supports a pulley (7) which forms an integral part of a radially, inwardly directed coupling element (8). Shaft (11) is centered solely by coupling element (8) without the need for a second bearing between the shaft and the bore in the hollow stud of the housing flange. Terminal end (10) of shaft (11) is polygonally shaped and the bore in ring shaped projection (9) is also polygonal to provide a connection between the coupling element and the shaft capable of transmitting torque. Note that coupling element (8) is free to move axially on shaft (11) and by this arrangement the pulley (7) also has freedom of axial movement on the shaft. More specifically as illustrated, the coupling element is pressed axially outwardly by a helical spring (18) mounted between contact surface (14) of the stop ring (16) mounted by means of a spring ring (15) on shaft (11) and the inside surface (17) of coupling element (8). By this arrangement, outer ring (6) of bearing (5) is held axially in place in the pulley (7) and is tightened axially with respect to inner ring (4) which is fixed in place on the hollowed stud (3). Consequently, the play of the roller bearing is eliminated. In order to eliminate axially displacement on coupling element (8), a stop ring (20) is secured by spring ring (19).

A plurality of openings (21) are provided in the periphery of the coupling element (8) to facilitate tools for mounting the roller bearing (5) on the hollow stud (3).

Housing flange (1) is mounted by means of fastening screws (23) inserted through holes (22) to the water pump housing (not shown). A seal (24) seals the pump chamber from the ambient atmosphere and is located between the housing flange (1) and the pump rotor (13).

Figure 2:
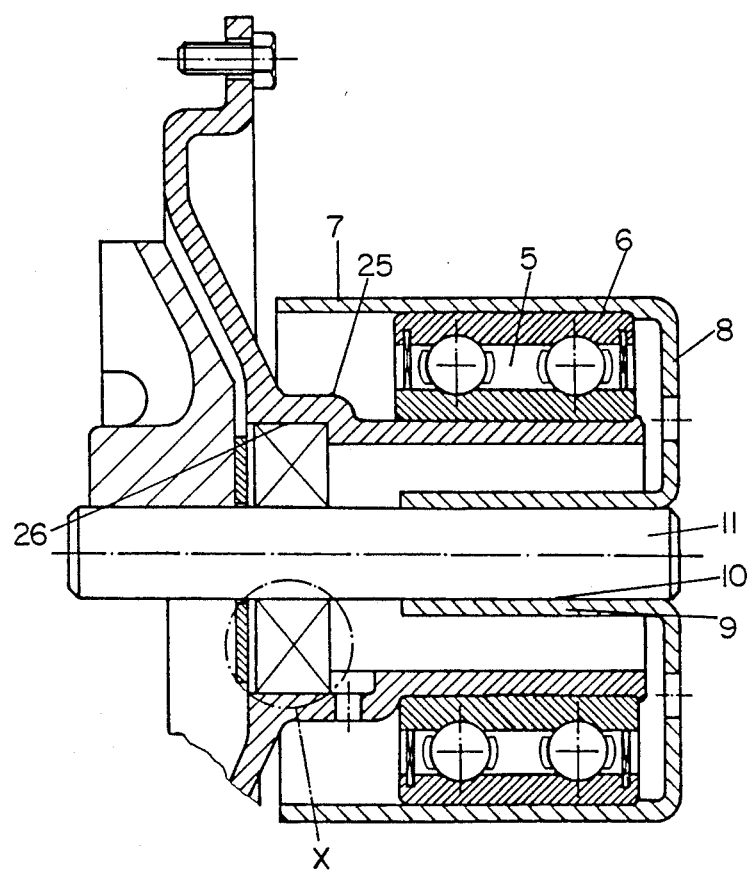
FIG. 2 is a transverse cross sectional view of another embodiment of the present invention wherein the coupling element is mounted on the shaft without freedom of axial movement and the spring is installed between the shaft and the housing flange.
Figure 3:
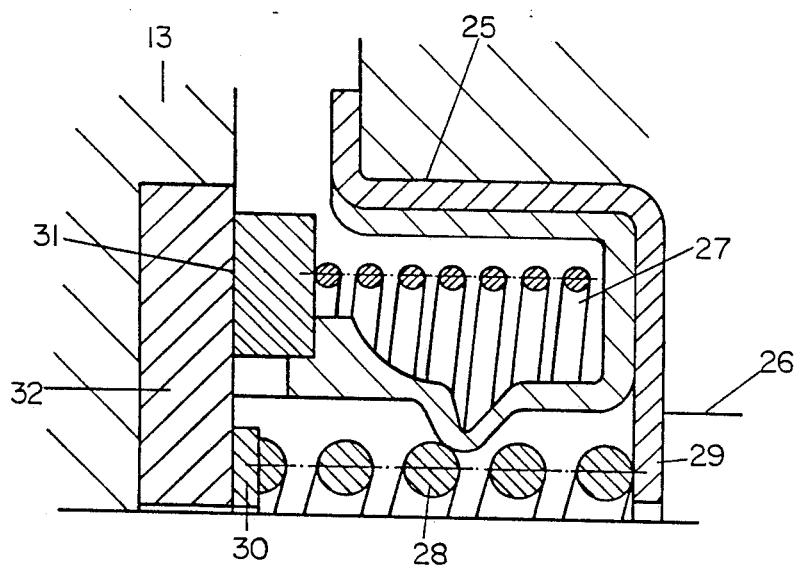
FIG. 3 and 4 shown enlarged area of the detailed identified as "X" in FIG. 2.

There is illustrated in FIG. 2 another embodiment of drive and bearing for a water pump in accordance with the present invention. This embodiment is generally similar to that previously described. However in this instance the coupling element (8) is integral with pulley (7) and is pressed tightly on the end (10) of shaft (11). A spring element located between shaft (11) and housing flange (1) functions to tighten roller bearing (5). As best shown in FIG. 3, an additional helical spring (28) located in the area of slip ring seal (27) is installed in a shoulder (25) of bore (26) and housing flange (1). This spring is supported at one end by housing (29) of slip ring seal (27) and at the other end by thrust washer (30) and in turn is supported on a second thrust washer (32) recessed in rear surface (31) of pump rotor (13). By this arrangement the shaft and thus the outer bearing (6) are drawn to the left with respect of the housing flange (1) and the roller bearing is tightened thereby to eliminate play.

Figure 4:
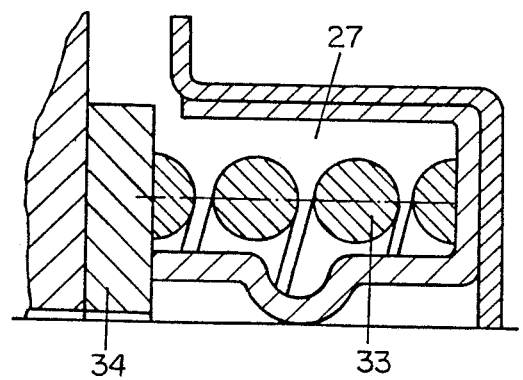

FIG. 4 shows a further modification of the elements of device circled in "X" in FIG. 1. In accordance with this modification spring (33) of slip ring seal (27) serves also to adjust roller bearing (5). The surface area of slip ring (34) is designed to be appropriate to the pressure which must be applied to the seal.

What is claimed is:

1. In a water pump having a water pump housing, a housing flange mounted on the water pump housing, a pump rotor rotatably journaled in the housing and a hollow stud projecting axially outwardly from the flange, a drive and bearing assembly for supporting the pump rotor comprising a roller bearing (5) supported on the outer peripheral surface of the hollow stud, a pulley rotatably supported by said roller bearing on the hollow stud of the housing flange, a shaft supporting the pump rotor and passing through the hollow stud and a coupling element connecting said pulley to the shaft in a torsion-proof manner and simultaneously centering the shaft whereby the roller bearing (5) is tightened to eliminate axial play.

2. Drive and bearing according to claim 1, including means for tightening the roller bearing (5) to eliminate axial play.

3. Drive and bearing according to claim 2, including spring elements (18, 28, 33) acting in the axial direction to eliminate the axial play of the roller bearing (5), said spring elements being located between shaft (11) and roller bearing (5).

4. Drive and bearing according to claim 1 wherein said coupling element (8) is mounted in a torsion-proof manner but with freedom of axial displacement on the shaft (11) and wherein the spring element (18) is provided between shaft (11) and coupling element (8)

5. Drive and bearing according to claim 4, wherein spring (18) acting in the axial direction is provided between a contact surface (14) on the shaft (11) and the coupling element (8).

6. Drive and bearing according to claim 4, wherein the shaft (11) is designed as a polygon and wherein a bore in the projection (9) of the coupling element (8) is designed as polygon of the complementary shape.

7. Drive and bearing according to claim 1, wherein the coupling element (8) is connected in a torsion-proof manner and without freedom of axial displacement to the shaft (11) and in the spring element (28, 33) is provided between the shaft (11) and the housing flange (1).

8. Drive and bearing according to claim 7, wherein a spring (28, 33) acting in the axial direction is provided between a contact surface on shaft (11) and the housing flange (1).

9. Drive and bearing according to claim 8, wherein a rear surface (31) of the pump rotor (13) is provided as the contact surface for the spring (28, 33).

10. Drive and bearing according to claim 9, wherein a thrust washer (32) of friction-reducing material is recessed into the rear surface (31) of the pump rotor (13).

11. Drive and bearing according to claim 8, including a slip ring seal (27) equipped with and an adjusting spring (33) which serves simultaneously to eliminate the axial play of the roller bearing (5).

12. Drive and bearing according to claim 1, wherein the coupling element (8) is designed as spring element acting in the axial direction, which is connected in a torsion-proof manner without freedom of axial displacement to shaft (11) and to pulley (7).

13. Drive and bearing according to claim 1, wherein the pulley (7) and the coupling element (8) form an integral part.

14. Drive and bearing according to claim 13, wherein the pulley (7) and the coupling element (8) are designed in the form of a cup, and an axially inward-directed, essentially ring-shaped projection (9) is provided in the center of the bottom of the cup, this projection fitting onto the end (10) of the shaft (11).

* * * * *